(12) United States Patent
Covi

(10) Patent No.: US 11,292,157 B2
(45) Date of Patent: Apr. 5, 2022

(54) SET OF PREFORMS FOR MAKING A CONTAINER, CONTAINER AND METHOD

(71) Applicant: Emanuela Covi, Merano (IT)

(72) Inventor: Emanuela Covi, Merano (IT)

(*) Notice: Subject to any disclaimer, the term of this patent is extended or adjusted under 35 U.S.C. 154(b) by 17 days.

(21) Appl. No.: 16/619,744

(22) PCT Filed: Jun. 5, 2018

(86) PCT No.: PCT/IT2018/050102
§ 371 (c)(1),
(2) Date: Dec. 5, 2019

(87) PCT Pub. No.: WO2018/225109
PCT Pub. Date: Dec. 13, 2018

(65) Prior Publication Data
US 2020/0094441 A1    Mar. 26, 2020

(30) Foreign Application Priority Data

Jun. 6, 2017   (IT) .................. 102017000061379

(51) Int. Cl.
*B65D 1/02*   (2006.01)
*B65D 25/16*  (2006.01)
(Continued)

(52) U.S. Cl.
CPC .......... *B29B 11/14* (2013.01); *B29C 49/0073* (2013.01); *B29C 49/22* (2013.01);
(Continued)

(58) Field of Classification Search
CPC .... B65D 11/06; B65D 1/0215; B65D 1/0246; B65D 25/16; B65D 77/06; B29B 2911/143; B29B 11/14; B29C 49/0073
See application file for complete search history.

(56) References Cited

U.S. PATENT DOCUMENTS

| | | | |
|---|---|---|---|
| 2005/0218103 A1* | 10/2005 | Barker | B29B 11/14 215/44 |
| 2008/0164289 A1* | 7/2008 | Kiser | B65D 77/06 222/500 |
| 2008/0260978 A1 | 10/2008 | Van Hove et al. | |
| 2012/0132607 A1* | 5/2012 | Landman | B65D 1/023 215/12.1 |

(Continued)

FOREIGN PATENT DOCUMENTS

| | | |
|---|---|---|
| EP | 2203362 A1 | 7/2010 |
| EP | 2238047 A1 | 10/2010 |

(Continued)

OTHER PUBLICATIONS

Search Report for International Application No. PCT/IT2018/050102 dated Sep. 11, 2018.

*Primary Examiner* — Robert B Davis
(74) *Attorney, Agent, or Firm* — Calfee Halter & Griswold LLP

(57) ABSTRACT

A set of preforms to make a container for beverages, comprising an external preform and an internal preform, each intended to form respectively an external keg and an internal bag of the container. The internal preform is associated internally with the external preform in order to define with the external preform a hollow space. The external preform and the internal preform have respective coupling members suitable to clamp the external preform and the internal preform with respect to each other in a desired reciprocal position.

5 Claims, 2 Drawing Sheets

(51) Int. Cl.
*B65D 77/06* (2006.01)
*B29B 11/14* (2006.01)
*B29C 49/00* (2006.01)
*B29C 49/22* (2006.01)
*B65D 8/00* (2006.01)
*B29C 49/02* (2006.01)
*B29K 67/00* (2006.01)
*B29L 9/00* (2006.01)

(52) U.S. Cl.
CPC .............. *B65D 11/06* (2013.01); *B65D 25/16* (2013.01); *B65D 77/06* (2013.01); *B29B 2911/143* (2013.01); *B29B 2911/1442* (2013.01); *B29B 2911/14573* (2013.01); *B29C 2049/024* (2013.01); *B29K 2067/003* (2013.01); *B29L 2009/001* (2013.01)

(56) References Cited

U.S. PATENT DOCUMENTS

| | | |
|---|---|---|
| 2012/0187067 A1 | 7/2012 | Maas et al. |
| 2014/0203039 A1 | 7/2014 | Maas et al. |
| 2015/0210524 A1 | 7/2015 | Witte et al. |
| 2015/0266620 A1 | 9/2015 | Van Hove et al. |
| 2016/0200562 A1* | 7/2016 | Hanssen ................. B67D 7/36 222/183 |
| 2016/0236806 A1 | 8/2016 | Tom et al. |

FOREIGN PATENT DOCUMENTS

| | | | |
|---|---|---|---|
| EP | 2448735 | A2 | 5/2012 |
| JP | 58187319 | A | 11/1983 |
| JP | 10180853 | A | 7/1998 |

* cited by examiner

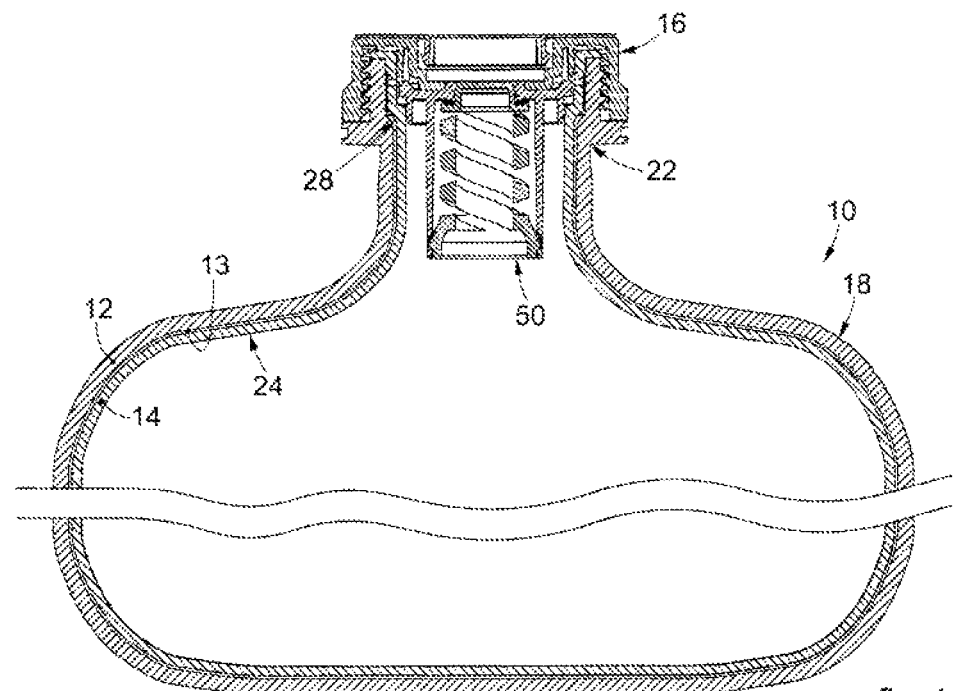
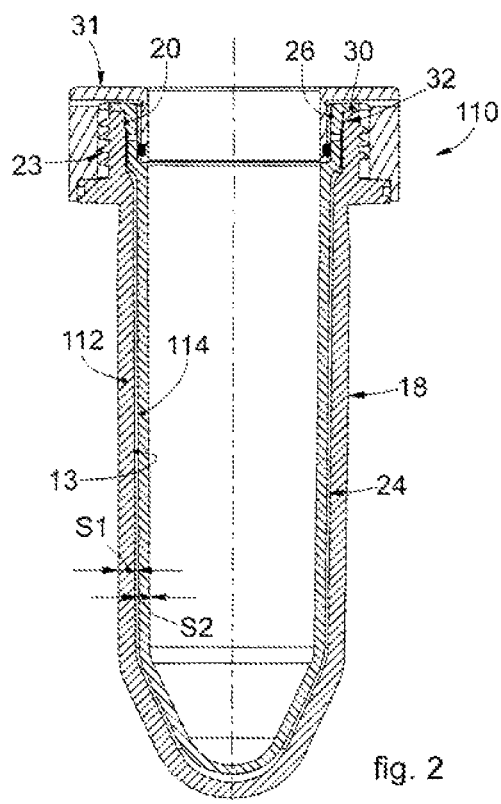 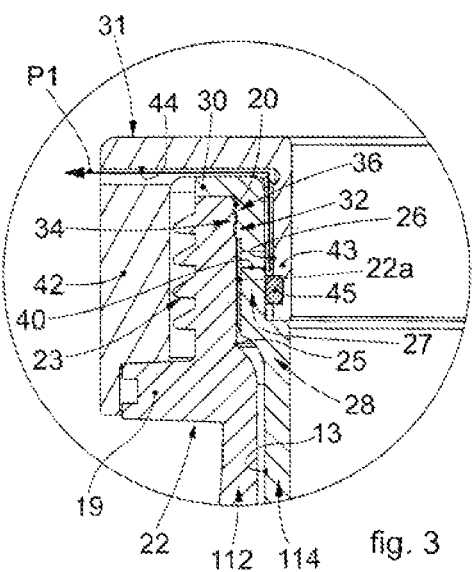

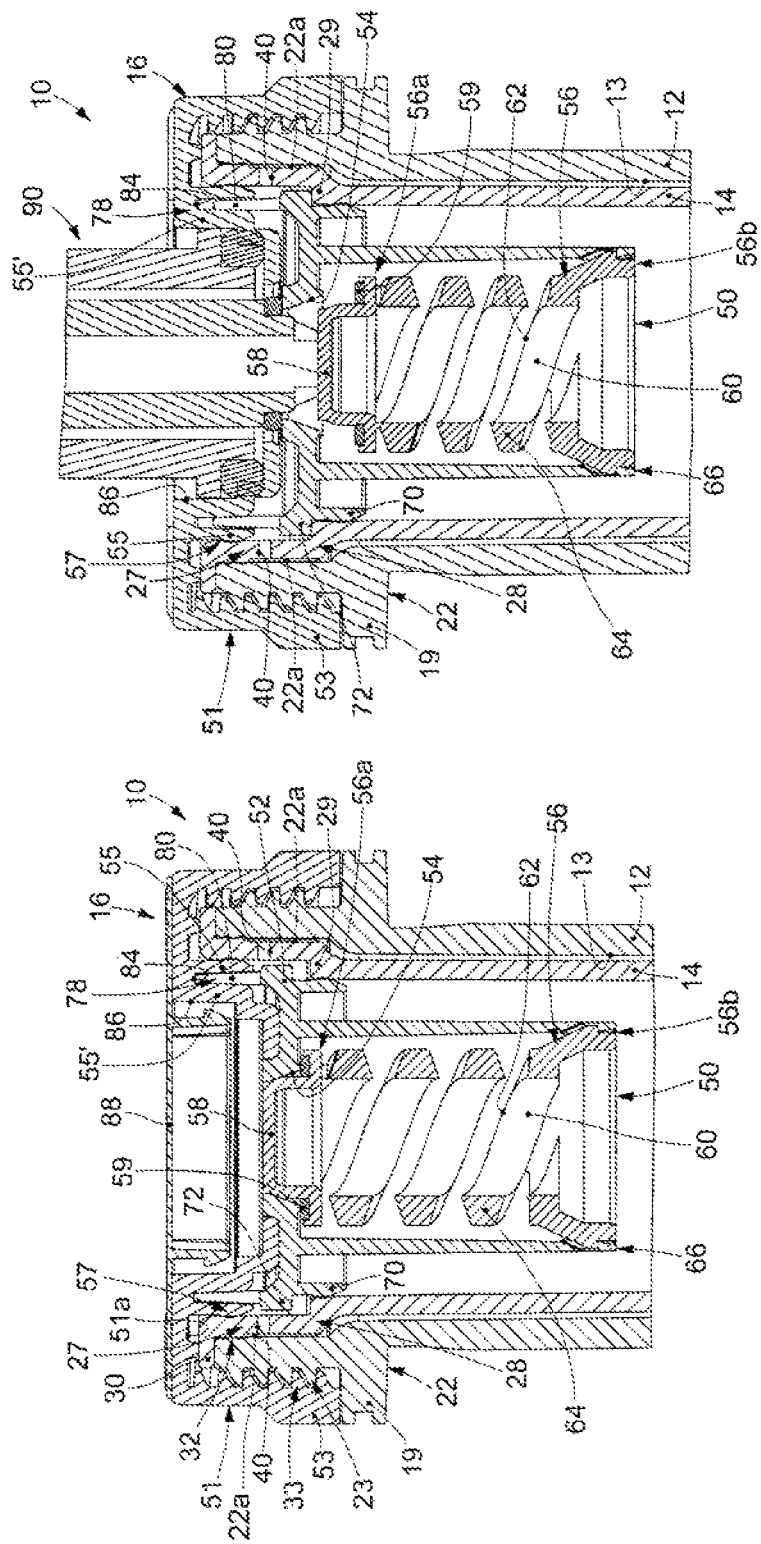

SET OF PREFORMS FOR MAKING A CONTAINER, CONTAINER AND METHOD

CROSS-REFERENCE TO RELATED APPLICATIONS

This application is a 371 of PCT Application No. PCT/IT2018/050102 filed on Jun. 5, 2018, which claims priority to Italian Application No. 102017000061379 filed on Jun. 6, 2017, the contents of which are hereby incorporated by reference as if recited in their entirety.

FIELD OF THE INVENTION

The present invention concerns a container for beverages, and a method to make the container for beverages using preforms.

BACKGROUND OF THE INVENTION

Large volumes of beverages, carbonated or not, are generally delivered to the place of consumption in metal containers, also called kegs in the specific field, which typically have a volume of more than 5 liters, or even more than 30 liters.

Generally these containers are associated with delivery devices which can comprise devices to cool the beverage, cartridges, or carbon dioxide deliverers, configured to cool and deliver the beverage from the container.

The metal containers are normally used in "return" mode, so that they are filled with a beverage, distributed by a distributor to a consumer, and subsequently recovered to be subjected to washing and sanitizing operations before being filled again with the beverage.

One disadvantage of metal containers is that they have a constant bulk both in the full condition and in the empty condition, entailing the need to have dedicated spaces suitable on the one hand to have sufficient full reserve containers, and on the other hand to accumulate the empties that have to be returned.

Another disadvantage of metal containers is that they are heavy, so that they add a considerable weight to that of the beverage contained therein. This entails both a high load to be transported to take the full containers to their destination, and also difficulty in moving them for the operators involved, in order to replace the empty containers on each occasion.

Another disadvantage is that the extraction of the beverage, at least when it is carbonated, generally takes place by introducing carbon dioxide ($CO_2$) under pressure into it. This causes the carbon dioxide to interact with the beer, so that the beer tends to become saturated, foam is formed and therefore it can be difficult to extract the beverage.

Furthermore, metal containers have high costs both in their manufacture and in maintenance and sanitation, operations that must be repeated for each new use.

Containers made of light plastic materials, at least partly flexible, which allow to reduce the overall weight to be transported, are also known. These containers comprise a container, or an external rigid bag, and a container, or internal flexible bag, in which the two internal and external containers are joined together in correspondence with the neck.

Plastic containers are generally made by blowing a preform, or two preforms inserted one inside the other, and suitable to define respectively the internal container and the external container.

Solutions are known which provide to make two external preforms and an internal container, in which the beverage is introduced into the internal container.

Solutions are also known with two preforms, in which the beverage is introduced between the internal container and the external container, so as to empty the internal container and reduce it to a "collapsed" state, and the beverage is delivered by introducing air into the internal container, so as to expand it and thus determine the delivery of the beverage.

This solution, for example, is described in document WO-A-2016/079248 which describes a container assembly comprising an external container, inside which an internal bag is inserted. The internal bag defines a pressure space for a fluid inside the internal bag itself, and a space for the beverage between the internal bag and the external container. The internal bag is partly supported by the external container, however it does not guarantee a secure and reliable clamping of the internal bag and external container, and moreover, the container assembly requires complex and specialized delivery devices.

Solutions are also known in which the beverage is contained in the internal container and the delivery thereof is performed by introducing pressurized air between the external container and the internal container, so as to cause compression and collapse of the internal container, and therefore the delivery of the pressurized beverage.

Document WO-A-2014/077681 describes a container comprising an internal container and an external container. The internal container is completely inserted inside the external container, partly supported by a shoulder of the latter. The shoulder, however, only prevents movement in the axial direction of the internal container and does not guarantee a stable coupling of the internal container and the external container, and therefore other devices are needed to determine the reciprocal clamping of the containers.

Document WO-A-2008/129012 describes a container having an internal bag and an external bag, with a mouth that fluidically connects the internal volume of the container with the atmosphere. The container also comprises at least one interface aperture which fluidically connects the interface between the internal bag and the external bag with the atmosphere.

Document WO-A-2014/081294 describes a container comprising an external container and an internal container suitable to contain the beverage. The internal container is flexible and therefore is compressible during use. The internal container and the external container are connected to each other in correspondence with the neck region. The external container also comprises a first aperture through which the internal container can be inserted, and a second aperture, opposite the first aperture, which can be connected to pressurization devices to introduce a pressurized gas between the external container and the internal container. The conformation of the container entails complex and specific delivery systems, with a large number of parts. Furthermore, the conformations of the internal container and the external container are not such as to guarantee an efficient reciprocal clamping.

Furthermore, containers made of plastic material known in the state of the art require complex closing and delivery systems, which on the one hand must guarantee the seal between the external container and the internal container, and on the other hand must provide at least circuits for the delivery and passage of the beverage, both for the passage of air, and also for the passage of the fluids provided for the delivery of the beverage itself.

One purpose of the present invention is to provide an assembly of preforms to make a container, and a corresponding container for beverages which are improved with respect to those known in the state of the art.

One purpose of the present invention is to provide preforms which can be securely and effectively clamped with respect to each other.

One purpose of the present invention is to provide a container for beverages that is light and can therefore be moved by an operator in a simple and effortless manner.

Another purpose is to provide a "disposable" container for beverages that can possibly be recycled, and in any case disposed of in a simple manner and at limited cost, in the state in which it is at the end of delivery, that is, without needing to provide washing and sanitizing operations.

Another purpose is to provide a container for beverages which can be at least partly deformed once completely emptied, so as to reduce its overall bulk.

Another purpose is to provide a container for beverages which integrates a simplified system which allows the exit of the beverage and which is compatible with known delivery devices, without having to provide specific devices different from those on the market.

Another purpose of the present invention is to provide preforms suitable to obtain a container for beverages in a simple and effective manner.

Another purpose is to perfect a method to produce a container for beverages which allows high production rates.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a container for beverages is provided, generally called "keg".

The container, according to the invention comprises an external keg, an internal bag disposed in the external keg and suitable to contain the beverage, and a closing device coupled with them to close the container.

In accordance with possible embodiments, the closing device can be associated with devices, of the known type, to deliver beverages.

According to some embodiments, the beverage contained in the container can be a carbonated beverage, for example beer, sparkling wine or a non-alcoholic beverage, or a non-carbonated beverage, for example wine in general, or also other.

According to some embodiments, the external keg is not very deformable and is resistant to internal pressure, so as to define the structure of the container thereof, while the internal bag is preferably compressible.

According to some embodiments, the external keg and the internal bag are made of plastic material.

Preferably the external keg and the internal bag are made of polymer material, for example PET, possibly modified with additives which increase the barrier properties to preserve the organoleptic characteristics of the beverage contained in them.

According to some embodiments, the external keg and the internal bag are obtained by blowing respective external and internal preforms.

The internal preform and the external preform have respective coupling members suitable to clamp them in a desired reciprocal position, connecting them to each other so as to define a set substantially in a single body, at the same time obtaining the hydraulic and aerolic seal of the hollow space first between the two preforms and then between the concentric external keg and internal bag.

The internal preform and/or the inside of the external preform can provide covering or lining means or other, which prevent the stabilized adherence between the two facing surfaces.

According to some embodiments of the invention, between the internal preform and the external preform there are mechanical seal means to improve the reciprocal clamping and the corresponding fluidic seal.

The reciprocal clamping of the preforms allows to facilitate the operations of moving, aligning and feeding the preforms to a blowing machine, and therefore to simplify the operations to make the container.

According to other embodiments, the internal preform has passage means for the air with a double function. On the one hand the passage means for the air serve to control the development of the two preforms during the blowing step of the container; on the other hand they are used for the air to exit, which is in the hollow space between the internal preform and the external preform.

In addition the conformation of the mouth of the internal preform is such that it allows to simplify the components that cooperate with it to obtain a final container, at the same time guaranteeing the seal thereof.

Moreover, the conformation of the respective external and internal surfaces of the preforms (and therefore of the external keg and the internal bag of the container) allow to install a simplified closing device, which guarantees the fluidic and mechanical seal of the container itself, at the same time making the known delivery devices directly usable.

In addition, the conformation of the mouth of the internal preform allows to simplify the internal washing of the container just produced, or, according to other possible variants of the application, after use, in order to possibly be filled with a new beverage.

The present invention also concerns a method to make a container for beverages, which provides to insert an internal preform in an external preform, coupling them mechanically with one another, defining a mechanical seal between them, and feeding the assembled set formed by the two coupled preforms to a blowing machine, so as to obtain a container provided with an external keg and an internal bag inserted in each other.

The method also provides to feed air, or a fluid under pressure, into the internal preform in order to deform it, and at the same time deform the external preform to obtain an external keg with a defined volume and/or conformation, making the air inside the hollow space defined between the internal preform and the external preform exit to the outside through holes made in the internal preform.

The method to make the container also provides to introduce the beverage into the internal bag, and finally to close and seal the container with a closing device.

BRIEF DESCRIPTION OF THE DRAWINGS

These and other characteristics of the present invention will become apparent from the following description of some embodiments, given as a non-restrictive example with reference to the attached drawings wherein:

FIG. 1 is a partly sectioned schematic view of a container for beverages according to embodiments described here;

FIG. 2 is a schematic view in section of the preforms to make the container of FIG. 1;

FIG. 3 is an enlarged detail of the coupling zone between the preforms of FIG. 2;

FIG. 4 is an enlarged detail of the container for beverages of FIG. 1 in a closed condition;

FIG. 5 is an enlarged detail of the container for beverages of FIG. 1 associated with a delivery device.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Embodiments described here with reference to FIG. 1 concern a container 10 for beverages, also referred to in the specific field as "keg", of the type generally used to distribute large quantities of beverages.

According to some embodiments, the beverages generally distributed with such containers can be carbonated beverages, for example beer, sparkling wine, or non-alcoholic beverages, or non-carbonated beverages, for example wine or other kind of beverages.

The container 10 comprises an external keg 12, an internal bag 14, disposed inside the external keg 12 and suitable to contain the beverage, and a closing device 16 suitable to close the container 10.

According to some embodiments, the external keg 12 can act as a support structure of the container 10 itself, and can possibly be suitable to confer on the latter self-supporting characteristics, as it is not very deformable.

According to other embodiments, the internal bag 14 is preferably flexible and compressible, and can be compressed to induce the delivery of the beverage contained therein.

The internal bag 14 and the external keg 12 are separated by a hollow space 13 disposed to be filled with a pressurized gas, such as compressed air for example, thanks to which it is possible to cause the internal bag 14 to be crushed and therefore the beverage to come out.

The external keg 12 has a greater rigidity than the internal bag 14, therefore, when the pressurized gas is introduced into the hollow space 13, the external keg 12 tends to maintain its shape, and to function as a contrast for the pressurized gas, which acts against the internal bag 14, crushing it and compressing it.

According to possible embodiments, the external keg 12 and the internal bag 14 are obtained by blowing and the respective plastic deformation of respective preforms 112, 114.

According to embodiments described using FIG. 2, an external preform 112 is provided, and an internal preform 114 suitable to be inserted in the external preform 112 to form an assembled set 110 which can be fed to a blowing machine.

According to some embodiments, the external preform 112 has a tubular shaped external containing portion or body 18, having a first closed end, and a second end provided with a first aperture 20 in correspondence with a neck portion 22.

The internal bag 14 comprises an internal containing portion 24 having a first closed end, and a second end provided with a second aperture 26 in correspondence with a neck portion 28.

According to some embodiments, the containing portions 18, 24 expand during the blowing step, considerably increasing their volume, until an external keg 12 and an internal bag 14 are obtained, suitable to contain the desired quantity of beverage, for example from a few liters to a few dozen liters. The neck portions 22, 28, on the other hand, remain substantially unchanged during the blowing operations, keeping their shape and structure substantially unchanged.

According to some embodiments, it can be provided that the internal bag 14 and the external keg 12 are anchored to each other in correspondence with the bottom, for example by means of a same-shape coupling made during the blowing step.

According to some embodiments, the external preform 112 and/or the internal preform 114 can be made of polymer material.

According to some embodiments, the internal preform 114 and the external preform 112 can be made of the same material.

According to possible variants, the two preforms 114, 112 can be made of different materials.

According to some embodiments, at least one of the preforms 112, 114 is made of polyethylene terephthalate (PET).

According to possible variants, both the preforms 112, 114 are made of PET, made specifically, or possibly of a recycled type, thus simplifying the disposal and recycling of the containers 10.

According to possible variants, at least the internal preform 114 can be made of PET modified with additives which increase its barrier properties to preserve the organoleptic characteristics of the beverage that is to be contained in the internal bag 14.

According to some embodiments, the external preform 112 can have an external thickness S1 greater than an internal thickness S2 of the internal preform 114, so as to make the container 10 more robust and resistant to accidental impacts.

According to some embodiments, the external thickness S1 can be comprised between about 3 mm and about 9 mm. In this way, after the blowing operation, it is possible to obtain an external keg 12 having a final wall thickness sufficient to confer a determinate rigidity on it.

According to other embodiments, the thickness S2 can be comprised between about 2 mm and about 5 mm. In this way, after the blowing operation, it is possible to obtain an internal bag 14 having a thickness such as to make it easily compressible and deformable.

According to possible variants, the thickness of the two preforms 112, 114 can be the same.

According to some embodiments, it can be provided that the external 112 and internal 114 preforms have a constant thickness S1, S2 along the entire development thereof.

According to possible variants, it can be provided that the thickness S1, S2 of the external 112 and internal 114 preform is variable and differentiated between, for example, the containing portion 18, 24 and the neck portion 22, 28.

According to some embodiments, the external preform 112 comprises an annular edge 19 that extends in a direction transverse to the longitudinal axis X of the external preform 112, and develops along the entire circumference of the neck portion 22.

The annular edge 19 makes the external preform 112, and possibly the assembled set 110, easy to handle and manipulate, for example to feed it to the blowing machine.

The annular edge 19, according to some embodiments, ideally separates the neck portion 22 from the containing portion 18.

According to some embodiments, on the external surface of the neck portion 22 there is a threaded circumferential area 23 suitable to couple with a closing element 16 provided with a mating threading 33, to guarantee the closure of the container 10.

According to other embodiments, the neck portion 22 of the external preform 112 has an upper portion 21 with a slightly larger diameter than the containing portion 18, and defining a housing compartment 25 for the neck portion 28 of the internal preform 114.

In accordance with some embodiments, the conformation of the external neck portion 22 of the external preform 112, cooperating with the internal neck portion 28 of the internal preform 114, defines a non-linear passage for the air, or other fluid.

The passage can have a non-constant section, possibly increasing from inside the hollow space 13 toward the outside, or from the respective containing portions 18, 24 toward the neck portions 22, 28.

According to some embodiments, the internal preform 114 comprises, in correspondence with the neck portion 28, an upper portion 27 with a larger diameter than the containing portion 24, and defining a shoulder 29 facing toward the inside of the internal preform 114.

According to some embodiments, the shoulder 29 develops along the entire circumference of the internal preform 114.

In accordance with embodiments described for example with reference to FIGS. 2 and 3, the shoulder 29 can act as an abutment edge for a support element 31, for example usable during the blowing operations to keep the shape and sizes of the respective neck portions 22, 28 stable.

According to other embodiments, described for example with reference to FIG. 5, when the container 10 is in use, the shoulder 29 can also cooperate with a delivery device 90, defining an abutment suitable to guarantee the correct positioning of the latter.

According to some embodiments, in correspondence with the second aperture 26, the internal preform 114 comprises a protruding annular portion 30, which can define an abutment edge for the internal preform 114 when it is inserted into the external preform 112, positioning itself on the upper edge of the latter.

The protruding portion 30 in particular is configured to allow to position the internal preform 114 in the external preform 112, so that the internal preform 114 remains resting on, and partly outside the external preform 112.

According to some embodiments, the annular portion 30 extends on a plane orthogonal to the longitudinal axis X of the internal preform 114.

According to other embodiments, the annular portion 30 is suitable to adhere to the upper edge of the neck portion 22 of the external preform 112, forcing the internal preform 114 into the desired position, when the closing device 16 is applied to the container 10.

According to some embodiments, the internal preform 114 and the external preform 112 include respective coupling members 32 suitable to clamp them in a desired reciprocal position with respect to each other, substantially defining the assembled set 110 in a single body.

This allows to facilitate the operations to move, align and feed the preforms 112, 114 to a blowing machine, and thus to simplify the operations to make the container 10.

According to some embodiments, the coupling members 32 can be mechanical interference coupling means, or same-shape coupling means.

In accordance with possible solutions, the coupling members 32 are partly made on the internal surface of the external preform 112, and partly on the external surface of the internal preform 114.

According to some embodiments, the coupling members 32 can comprise a first shaped portion 34, for example threaded, or knurled, or in any case provided with hollows and protuberances on the internal surface of the neck portion 22 of the external preform 112.

The first shaped portion 34 can be disposed in correspondence with or in proximity to the upper edge of the external preform 112, or the first aperture 20.

The coupling members 32 can also comprise a second shaped portion 36, for example threaded or knurled, or in any case provided with hollows and protuberances on the external surface of the neck portion 28 of the internal preform 114.

According to some embodiments, the second shaped portion 36 can be disposed in correspondence with or in proximity to the upper edge of the external preform 112 below the protruding portion 30.

According to other embodiments, the first shaped portion 34 and/or the second shaped portion 36 extend over the entire circumference of the respective neck portions 22, 28.

According to other embodiments, the shaped portions 34, 36 are positioned so as to define, together with the protruding portion 30 which rests on the upper edge of the external preform 112, a mechanical seal between the two preforms 112, 114 which allows to obtain an assembled set 110.

In this way, the internal preform 114 can be inserted in any position whatsoever in the external preform 112, and be stably coupled therewith in correspondence with the respective neck portions 22, 28, without it being necessary to provide a specific relative orientation between them.

According to other embodiments, at least the respective containing portions 18, 24 in the assembled set 110 can be distanced from one another, defining between them the hollow space 13.

In accordance with other embodiments, the neck portion 28 of the internal preform 114 has at least one slit 22a that extends from the zone of the mechanical seal defined by the coupling members 32, as far as the narrowing in diameter, that is, as far as the end of the upper portion 27.

The slit 22a is made on the surface of the neck portion 28 of the internal preform 114 facing toward the hollow space 13 and the neck portion 22 of the external preform 112.

According to other embodiments, the internal preform 114 comprises, in correspondence with the internal neck portion 28, at least one through hole 40, or orifice, which connects the internal volume of the internal preform 114 with the hollow space 13.

According to some embodiments, the at least one through hole 40 develops in a radial direction with respect to the longitudinal axis X.

According to other embodiments, the at least one through hole 40 develops in a direction orthogonal to the longitudinal axis X.

According to possible variant embodiments, the at least one through hole 40 develops in an inclined direction with respect to the longitudinal axis X.

According to some embodiments, there are two or more through holes 40 distanced along the circumference of the neck portion 28.

According to some embodiments, the through hole or through holes 40 are disposed below the coupling members 32, that is, below the mechanical seal between the two preforms 112, 114.

According to some embodiments, the through holes 40 allow the air present in the hollow space 13 to escape during the blowing operations, so as to guarantee the perfect adherence of the internal preform 114 and the external preform 112, and to prevent any disuniformity forming between the external keg 12 and the internal bag 14, that is, to prevent the preforms 112, 114 being deformed incorrectly.

According to other embodiments, once the blowing steps have been completed, and the external keg 12 and the internal bag 14 have been obtained, the internal bag 14 is filled with the beverage, and finally the closing device 16 is applied to close the container 10 (FIGS. 1 and 4).

According to some embodiments, the closing device 16 can comprise a lid 51 suitable to couple with both the external keg 12 and the internal bag 14.

According to some embodiments, the lid 51 is shaped in such a way as to define an annular cavity 51a in which the neck portions 22, 28 of the external keg 12 and of the internal bag 14 coupled to each other can be inserted.

According to some embodiments, the annular cavity 51a is defined between an external edge 53 on which the threaded area 33 is internally made, and suitable to couple with the threaded area of the external neck portion 22, and an annular flap 55 protruding toward the inside, substantially parallel to the external edge 53, suitable to be inserted into the second aperture 26 of the internal bag 14.

According to some embodiments, the annular flap 55 and the internal neck portion 28 include mating mechanical interference means 57, which allow to define a mechanical seal between them. In this way, when the lid 51 is inserted and screwed to the external keg 12 and to the internal bag 14, it defines both a mechanical seal between the latter two, and also a fluidic seal of the container 10 itself, thus guaranteeing the overall hermetic seal and hence the integrity of the beverage contained therein.

The lid 51 also defines an external cavity 86 which, during a delivery step, receives a portion of the delivery device 90, as visible in FIG. 5.

The beverage can pass through the external cavity 86 to enter into, or exit from, the container 10, more particularly, from the internal bag 14.

According to other embodiments, the closing device 16 can also comprise a covering element, or stopper 88, disposed in the external cavity 86, which seals the lid 51 in the closed condition of the container 10, preventing dust, liquids, or dirt in general from coming into contact with it, thus preserving the beverage contained inside it from possible contamination.

The closing device 16 can also comprise, or be associated with, a valve unit 50, which can cooperate with a delivery device 90 (see FIG. 5) of a known type to allow the delivery of the beverage contained in the internal bag 14.

The valve unit 50 can be connected to and supported by the lid 51.

In one embodiment, the lid 51 and the valve unit 50 can be made of the same material. In particular, they can be made of plastic material, for example polyethylene terephthalate (PET). This makes the container 10 completely recyclable.

The valve unit 50 comprises a support element 52 which is configured to be attached to the lid 51.

According to some embodiments, the support element 52 is mobile with respect to the lid 51, defining respectively a configuration of non-use (FIG. 4) and a configuration of use (FIG. 5) of the valve unit 50.

In particular, in the configuration of non-use, the support element 52 is at least partly positioned in contact with the lid 51 to define the hermetic closure of the container 10, while in the configuration of use the support element 52 is at least partly distanced from the lid 51 to define a passage for the air between the through hole 40 and the outside of the container 10.

According to some embodiments, the support element 52 comprises attachment means 78 which allow to attach the support element 52 simply and quickly to the closing device 16, in particular to the lid 51.

In one embodiment, the attachment means 78 comprise an annular protrusion 80, suitable to be inserted into a mating annular recess 84 made on the lid 51.

According to some embodiments, the annular recess 84 is defined by the annular flap 55 and by a second annular flap 55', which extends substantially concentric to the annular flap 55.

The support element 52 also comprises at least one passage aperture 54 (better seen in FIG. 4) which the beverage can pass through to enter into, or exit from, the container 10, in particular from the internal bag 14.

According to other embodiments, the support element 52 can comprise a protruding lip 70, which is suitable to be inserted into the neck portion 28 of the internal bag 14, under the shoulder 29, and remain clamped inside it through interference, defining another mechanical seal between the closing device 16 and the internal bag 14.

In accordance with other embodiments, above the protruding lip 70, the valve unit 50 can comprise a protruding annular edge 72, suitable to rest on the shoulder 29 during the insertion of the delivery device 90, so as to define a correct positioning of the latter in the container 10.

The closing device 16, combined with the particular conformation of the preforms 112, 114 and therefore of the external keg 12 and of the internal bag 14, allows to use a valve unit that is drastically simplified compared with known devices.

The present invention also concerns a method to make a container for beverages 10 which provides to insert an internal preform 114 into an external preform 112, so as to define an assembled set 110, to feed the assembled set 110 to a blowing machine, and to introduce pressurized air into the internal preform 114 so as to dilate it and deform it, and consequently to deform the external preform so as to obtain both the internal bag 14 and the external keg 12 with a single blowing operation.

According to one aspect of the invention, the method provides to mechanically couple the internal preform 114 with the external preform 112 by means of the coupling members 32 in correspondence with the respective neck portions 22, 28, thus guaranteeing a very stable mechanical connection between the respective preforms 112, 114, and at the same time a mechanical seal.

According to other embodiments, the method can provide to apply a silicone substance for food use between the two preforms 112, 114 so as to facilitate the assembly thereof.

According to other embodiments, during the blowing operation, the method provides to make the air that is located in the hollow space 13 between the internal preform 114 and the external preform 112 flow outside the hollow space 13 itself, through the through holes 40 present in the internal preform 114.

The method to make the container for beverages 10 also provides to introduce the beverage into the internal bag 114, and subsequently to close and seal the internal bag 114 and the external preform 112 by means of a closing device 16.

In accordance with other embodiments, the method provides to apply the closing device 16 by inserting the protruding annular flap 55 in the second aperture 26 of the internal bag 14 and by positioning the external edge 53 outside the external keg 12, and subsequently screwing it to the latter.

It is clear that modifications and/or additions of parts can be made to the container for beverages, the preforms and the method to make the container as described heretofore, without departing from the field and scope of the present invention.

It is also clear that, although the present invention has been described with reference to some specific examples, a person of skill in the art shall certainly be able to achieve many other equivalent forms of container for beverages, the preforms and the method to make the container, having the characteristics as set forth in the claims and hence all coming within the field of protection defined thereby.

The invention claimed is:

1. Set of preforms to make a container for beverages, comprising an external preform and an internal preform, each intended to form respectively an external keg and an internal bag of said container, said internal preform being associated internally with said external preform in order to define with said external preform a hollow space,
wherein said external preform and said internal preform have respective coupling members suitable to clamp said external preform and said internal preform with respect to each other at least axially along an axis in a desired reciprocal position,
wherein said respective coupling members allow to separate said hollow space from the external environment in a sealed manner and achieve a mechanical coupling by interference and are disposed in correspondence with respective neck portions for coupling said external preform and said internal preform,
wherein said coupling members comprise a first shaped portion provided with hollows and protuberances, made on a neck portion of one of either said external preform and said internal preform, and a second shaped portion provided with hollows and protuberances mating with those of said first shaped portion, made on the surface of said neck portion of the other of said external preform and said internal preform, said first and second shaped portions being disposed in correspondence with or in proximity to an upper edge of the respective preform,
wherein said internal preform has at least a slit that develops along said neck portion below the mechanical seal zone obtained by said coupling members, and
wherein in correspondence with said slit, said internal preform comprises at least one through hole that, when in operation, connects the internal volume of said internal preform with said hollow space,
wherein in the neck portion of said external preform there is a threaded circumferential area suitable to couple with a closing element and
wherein said internal preform, in correspondence with an aperture, comprises an annular portion protruding radially toward the outside and extending on a plane orthogonal to the longitudinal axis of the internal preform, said annular portion being conformed in such a way as to be positioned resting above the upper edge of said external preform when said internal preform is inserted and positioned in it.

2. Set of preforms as in claim 1, wherein in correspondence with an aperture, said internal preform comprises an annular portion protruding radially toward the outside, said annular portion being conformed in such a way as to be positioned resting above an upper edge of the neck portion of said external preform when said internal preform is inserted and positioned in it.

3. Set of preforms as in claim 1, wherein the neck portion of the external preform and the neck portion of the internal preform are conformed so as to define between them at least one portion of said hollow space having a non-constant section.

4. Container for drinks comprising an external keg and an internal bag associated internally with said external keg, said external keg and said internal bag being obtainable from respective preforms, defining between them a hollow space, and a closing device coupled therewith to close said container, wherein said external keg and said internal bag have respective coupling members suitable to clamp to each other said external keg and said internal bag at least axially along an axis in a desired reciprocal position, wherein said respective coupling members allow to separate said hollow space from the outside environment in a sealed manner and manner and achieve a mechanical coupling by interference and are disposed in correspondence with respective neck portions for coupling said external preform and said internal preform, wherein said coupling members comprise a first shaped portion provided with hollows and protuberances, made on a neck portion of one of either said external preform and said internal preform, and a second shaped portion provided with hollows and protuberances mating with those of said first shaped portion, made on the surface of said neck portion of the other of said external preform and said internal preform, said first and second shaped portions being disposed in correspondence with or in proximity to an upper edge of the respective preform, wherein said internal preform has at least a slit that develops along said neck portion below the mechanical seal zone obtained by said coupling members and wherein, in correspondence with said slit, said internal preform comprises at least one through hole that, when in operation, connects the internal volume of said internal preform with said hollow space, wherein in the neck portion of said external preform there is a threaded circumferential area suitable to couple with a closing element and wherein said internal preform, in correspondence with an aperture, comprises an annular portion protruding radially toward the outside and extending on a plane orthogonal to the longitudinal axis of the internal preform, said annular portion being conformed in such a way as to be positioned resting above the upper edge of said external preform when said internal preform is inserted and positioned in it.

5. Method to make a container for beverages having an external keg and an internal bag, wherein it provides:

to insert an internal preform in an external preform coupling them mechanically to each other so as to define an assembled set, coupling with each other respective coupling members made on said preforms defining a mechanical seal between them and achieving at the same time the fluidic seal of a hollow space between said preforms, wherein said coupling members allow to separate said hollow space from the outside environment in a sealed manner and achieve a mechanical coupling by interference and are disposed in correspondence with respective neck portions for coupling said external preform and said internal preform, wherein said coupling members comprise a first shaped portion provided with hollows and protuberances, made on a neck portion of one of either said external preform and said internal preform, and a second shaped portion provided with hollows and protuberances mating with those of said first shaped portion, made on the surface of said neck portion of the other of said external preform and said internal preform, said first and second shaped portions being disposed in correspondence with or in proximity to an upper edge of the respective preform, wherein said internal preform has at least a slit that develops along said neck portion below the mechanical seal zone obtained by said coupling members and wherein, in correspondence with said slit, said internal preform comprises at least one through hole that, when in operation, connects the internal volume of said internal preform with said hollow space, wherein in the neck portion of said external preform there is a threaded circumferential area suitable to couple with a closing element and wherein said internal preform, in correspondence with an aperture, comprises an annular portion protruding radially toward the outside and extending on a plane orthogonal to the longitudinal axis of the internal preform, said annular portion being conformed in such a way as to be positioned resting above the upper edge of said external preform when said internal preform is inserted and positioned in it;

to feed said assembled set to a blowing machine;

to introduce air, or fluid under pressure into said internal preform so as to deform it, and at the same time to deform said external preform to obtain an internal bag and an external keg having a defined volume and/or conformation so as to make said container, wherein, during the introduction of the air, or fluid under pressure, the method further to make the air that is in said hollow space exit through at least one through hole made in said internal preform.

* * * * *